Oct. 6, 1942.	P. VALLARELLI	2,298,024
ENVELOPE OPENER
Filed April 15, 1942	2 Sheets-Sheet 1
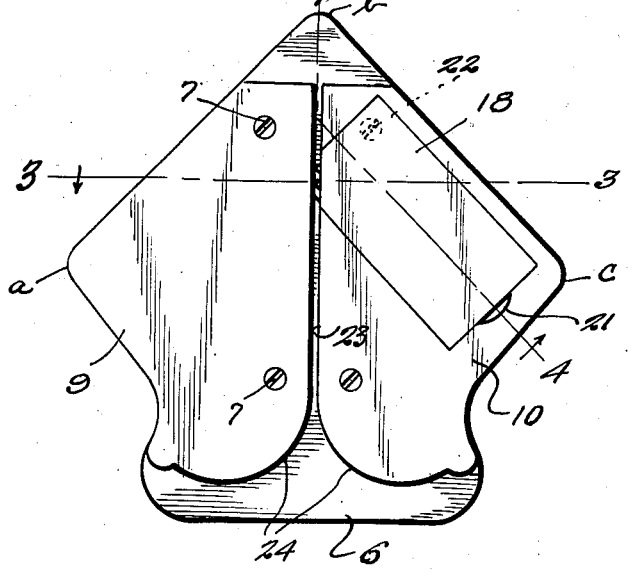
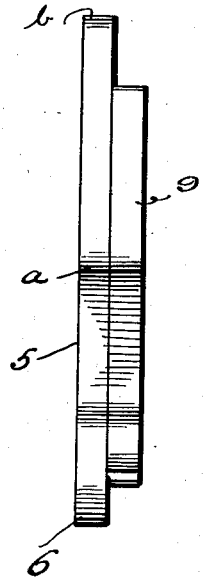
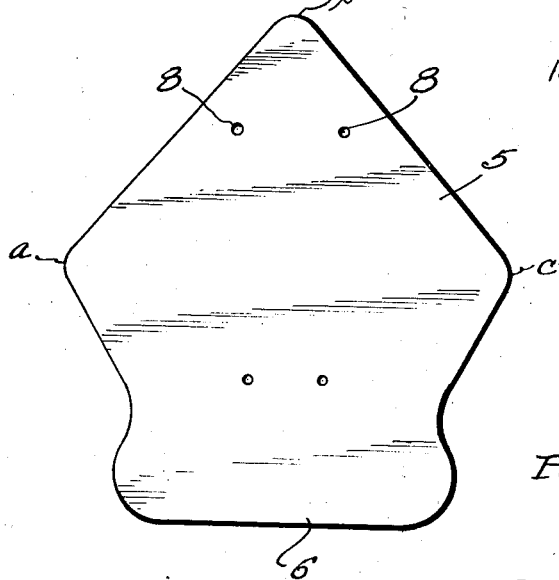
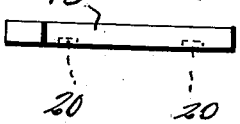
Inventor
Pasquale Vallarelli
By Clarence A. O'Brien
and Harvey B. Jacobson, Attorneys Oct. 6, 1942.                P. VALLARELLI                2,298,024
                             ENVELOPE OPENER
                        Filed April 15, 1942            2 Sheets-Sheet 2

Inventor
Pasquale Vallarelli
By Clarence A. O'Brien
and Harvey B. Jacobson, Attorneys Patented Oct. 6, 1942

2,298,024

UNITED STATES PATENT OFFICE 2,298,024

ENVELOPE OPENER

Pasquale Vallarelli, Leavenworth, Kans.

Application April 15, 1942, Serial No. 439,137

5 Claims. (Cl. 30—294)

This invention relates to new and useful improvements in openers for envelopes, the principal object of the invention being to provide an opener which can be used to open letters without roughly ripping the envelope or mutilating the contained letter.

Another important object of the invention is to provide an opener which will not only be simple to construct and easy to operate, but which will be exceedingly quick and appreciated by business houses handling considerable mail.

Other objects and advantages of the invention will become apparent to the reader of the following description.

In the drawings—

Figure 1 represents a bottom plan view of the opener.

Figure 2 is an edge elevational view.

Figure 5 is a plan view of the back plate.

Figure 10 is a plan view of the trap plate.

Figure 11 is an edge elevational view of the plate shown in Figure 10.

Figure 8:
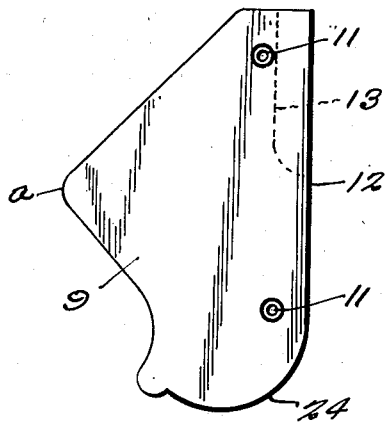
Figure 8 is a top plan view of the wing member complementary to the wing member shown in Figure 6.
Figure 9:
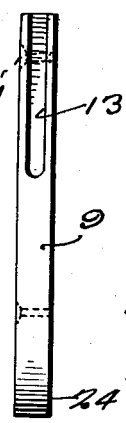
Figure 9 is an edge elevational view of the wing member shown in Figure 8.
Figure 6:
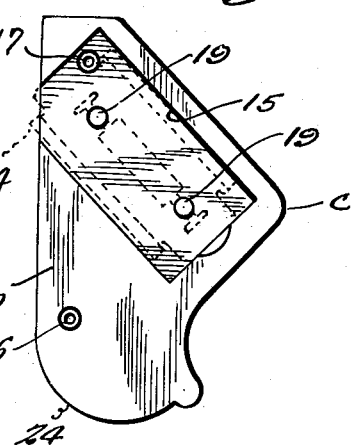
Figure 6 is an inside elevational view of the pocketed wing member.

Referring to the drawings wherein like numerals designate like parts, it can be seen that numeral 5 denotes a back plate or body substantially square in shape, having at least three corners a, b and c, while the remaining corner is substituted for by a projecting stock 6, which can lay against the palm of the hand when the implement is in use.

Secured to the back 5 at one side thereof by screws 7 passing through openings 8 in the back 5, are wing plates 9, 10, the plate 9 having openings 11 therein for accommodating the screws 7. The forward end portion of the plate 9 at its straight edge 12 is formed with a groove 13 for receiving the corresponding corner portion of a blade 14, such as a razor blade, which projects through one corner portion of a rectangular shaped pocket 15 formed in the complementary wing plate 10. The plate 10 has an opening 16 for one of the screws 7, and a second opening 17 which comes through the bottom of the pocket 15, and a bolt or screw can be disposed through this opening 17 and into a trap plate 18 which snugly fits in the pocket 15.

Figure 3:
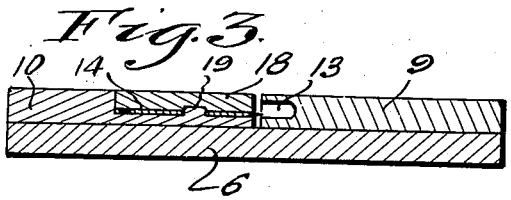
Figure 3 is a section on the line 3—3 of Figure 1.
Figure 7:
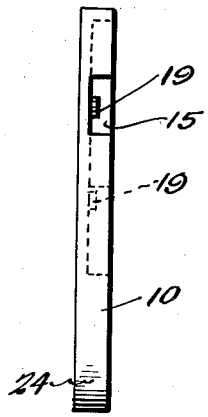
Figure 7 is an edge elevational view of the member shown in Figure 6.
Figure 4:
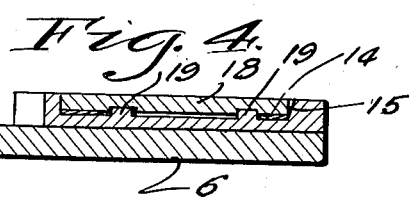
Figure 4 is a section on the line 4—4 of Figure 1.

Studs 19, 19 rise from the bottom of the pocket 15 and project through the usual openings in the razor blade 14, and as can be seen in Figures 3 and 4, the trap plate 18 is formed with small recesses 20 at the bottom thereof to receive the upper ends of these studs.

The wing plate 10 at one end of the trap plate 18 is formed with a fingernail receiving slot 21 so that the plate 18 can be pryed loose after the screw 22 has been loosened.

As can be seen in Figure 1, the wing plates 9, 10 are closely spaced apart with the projecting corner portion of the blade traversing the same, and partly projecting into the slot 13 of the wing plate 9. This defines a slotway 23 in which the edge portion of a letter envelope can be received and at the entrance end of this, the wing plates 9, 10 are cut off on arcs 24 to facilitate application of the opener to an envelope.

A slight movement of the opener along the edge of an envelope will cut the envelope with precision and without mutilation, and without in any way damaging the contents of the envelope although the envelope may be entirely filled by its contents.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A letter opener comprising a back member, a pair of closely spaced members on one side of the back defining a slideway, and a blade carried by one of the members and intersecting the slideway.

2. A letter opener comprising a back member, a pair of closely spaced members on one side of the back defining a slideway, and a blade carried by one of the members and intersecting the slideway, said member carrying the blade being formed with a pocket for receiving the blade, and a trap plate for closing the pocket.

3. A letter opener comprising a back member, a pair of closely spaced members on one side of the back defining a slideway, and a blade carried by one of the members and intersecting the slideway, said member carrying the blade being formed with a pocket for receiving the blade, and a trap plate for closing the pocket, said pocket having stud members for position through a blade, said trap plate having recesses therein for receiving the studs.

4. An opener of the character described comprising a plate having a finger engageable stock at one portion thereof, outwardly protruding members on the plate closely spaced to define an envelope receiving slot, a blade carried by one of the members, the other member having a recess therein for receiving a portion of the blade, and a closure plate for the blade.

5. An opener of the character described comprising a plate having a finger engageable stock at one portion thereof, outwardly protruding members on the plate closely spaced to define an envelope receiving slot, a blade carried by one of the members, the other member having a recess therein for receiving a portion of the blade, and a closure plate for the blade, said members on the plate being removably attached to the plate.

PASQUALE VALLARELLI.